United States Patent Office 2,694,735
Patented Nov. 16, 1954

2,694,735

METHOD OF PREPARING OXYGENATED COMPOUNDS

David C. Hull and Hugh J. Hagemeyer, Jr., Kingsport, Tenn., assignors to Eastman Kodak Company, Rochester, N. Y., a corporation of New Jersey No Drawing. Application December 6, 1949, Serial No. 131,499

9 Claims. (Cl. 260—604)

This invention relates to the production of oxygenated compounds, such as aldehydes and the like. More particularly, however, this invention is concerned with the production of the normal or straight chain aldehydic compounds, such as normal butyraldehyde, by a process involving the reaction of an olefinic compound with a source of carbon monoxide and hydrogen wherein the reaction is conducted in a certain manner (in the presence of water) so that a high yield of the normal compound is obtained at high reaction rates.

This invention is a continuation-in-part of our applications of Hugh J. Hagemeyer, Jr., and David C. Hull, Serial No. 22,716 filed April 22, 1948, and Serial No. 78,938 filed March 1, 1949, now abandoned.

There are a number of publications and patents outstanding which describe the reaction of various types and kinds of olefinic materials, both aliphatic and cyclic, with carbon monoxide and hydrogen and other components in the presence of various catalysts to obtain oxygenated compounds of the class indicated. The most interesting prior art of which we are aware comprises certain foreign descriptions concerning German processes for the reactions of olefins with carbon monoxide and hydrogen. These reactions were carried out in the presence of a solid catalyst comprising cobalt, thoria, magnesia, and kieselguhr in toluene or the like hydrocarbon as a diluent. Various temperatures and pressures are described.

It will be observed, however, that with respect to such prior art processes, although oxygenated compounds were obtained, a mixture resulted. For example, in processes for producing butyraldehyde, an amount of isobutyraldehyde of the order of that of the normal butyraldehyde was also produced, as well as a certain amount of ketones. Therefore, in general, in the processes of the prior art, when reactions of the class indicated were carried out, there was the disadvantage that the yield of reaction product contained large amounts of the alpha substituted or iso compound and the like. As is known, the normal or straight chain compound frequently has more value and may be the compound desired in many instances. It is further apparent that, even though in instances where the iso compound produced does have value, if the normal compound is the desired compound, there are problems of separation and disposal involved if undue amounts of the iso compound are also produced.

In accordance with the present invention, it has been discovered that reactions of the class indicated, namely, the reaction of olefins, carbon monoxide, and hydrogen in the presence of a catalyst, may be carried out in a simple and practical manner so that the yield of the normal or straight chain carbonyl compound predominates, and that this desired reaction may be caused to take place at a relatively high rate in accordance with the present invention. It is at this point to be noted that the present invention constitutes an improvement over our companion copending applications aforementioned in higher reaction rate and other advantages.

This invention has for one object the production of oxygenated compounds by a type of reaction wherein predominant yields of the desired straight chain compound may be obtained at high reaction rates. A particular object is to provide a method for the production of oxygenated compounds such as aldehydes wherein the reaction may be directed to the formation principally of the normal or straight chain aldehyde. Another object is to provide a process for the reaction of olefins, carbon monoxide, and hydrogen which is carried out in the presence of a predetermined reaction medium containing water. A still further object is to provide a method for the production of normal butyraldehyde which, as produced, contains only a relatively small amount of isobutyraldehyde. Still another object is to provide a method for reacting propylene with carbon monoxide and hydrogen at high reaction rates whereby the yield of normal butyraldehyde in the reaction product predominates. Other objects will appear hereinafter.

As already discussed above, in the well-known reaction of olefins with carbon monoxide and hydrogen, various secondary products may be formed along with the desired primary product. For example, in the manufacture of aldehydes from olefins, carbon monoxide, and hydrogen, ketones may be formed in amounts up to 30 percent of the weight of the product.

We have now found that a new and unpredictable result is obtained when the reaction medium, solution, or suspending liquid in which the reaction is carried out is of a certain character as will be described in detail hereinafter. In the prior art, it has been customary to employ as the reaction medium such non-aqueous solvents as toluene and the like hydrocarbons. In contrast thereto, we have found that if certain other liquids, and particularly if a certain content of water is present, are employed as the reaction medium that the reaction products obtained are materially affected and that yields predominating in the normal or straight chain product may be obtained at relatively high reaction rates. It is to be noted that the inclusion of water in the reaction environment in accordance with the present invention is distinctly different from those prior art processes wherein water is reacted with olefins and carbon monoxide to obtain acids.

While it is not desired to be bound by any theory concerning the mechanism of our reaction, the following explanations may serve to some extent to arrive at a better understanding of the invention.

The improved result of the present invention can be illustrated by the reaction of propylene with a source of carbon monoxide and hydrogen. The desired reaction is the formation of normal butyraldehyde from the propylene, carbon monoxide, and hydrogen in accordance with the following equation representing the formation of a straight chain or normal aldehyde:

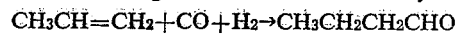
$$CH_3CH=CH_2+CO+H_2 \rightarrow CH_3CH_2CH_2CHO$$

However, under the prior art conditions of operation, there may also be formed substantial amounts of the "alpha methyl" or isobutyraldehyde in accordance with the following equation:

$$CH_3CH=CH_2+CO+H_2 \rightarrow (CH_3)_2CHCHO$$

That is, when the reaction is carried out in accordance with the prior art, using the standard cobalt-thoria-magnesia catalyst suspended or otherwise carried in toluene or the like hydrocarbons or other non-aqueous prior art reaction mediums, a 50:50±10 percent mixture of normal or isobutyraldehyde is usually obtained and at relatively low reaction rates.

In contrast thereto in accordance with the present invention, we have discovered that if the catalyst is suspended, dissolved, or otherwise contained or incorporated in certain liquids, preferably aqueous, as the reaction medium, such as aqueous butyraldehyde dibutylacetal, then the straight chain or normal aldehyde formation takes place to a predominant extent to the exclusion of the "alpha methyl" or isobutyraldehyde formation, and, surprisingly, at a relatively high reaction rate considerably faster than prior reaction rates. The catalyst contained in the reaction medium environment is preferably made up of a cobalt type of material which will form a cobalt carbonyl hydride. Cobalt salts of the lower aliphatic acids incorporated in the aforesaid special reaction liquids have been found to be useful materials which form catalysts for facilitating the reaction of olefinic materials with carbon monoxide and hydrogen.

In the broader aspects, the present invention concerns the reaction of a source of an olefinic material with a source of carbon monoxide and hydrogen carried out in the presence of a solution or suspension or the like of a suitable catalyst, the details concerning which will be set forth hereinafter, contained in the special aqueous reaction environment of the present invention. The reaction is carried out under elevated temperatures and pressures, for example, ranging from 90°–175° C. and generally around 140° C.±10° C. and at 40–700 atmospheres, for usual catalyst concentrations.

As is apparent from the foregoing, one important aspect of the present invention is the aqueous reaction environment. The water content may be from 0.1 to 20% by volume of the liquid in the reactor space. As already mentioned, the water in the present invention is not for entering into reaction with the olefin, and thereby distinguishes from prior art process concerning olefin, CO and $H_2O$ reaction to secure acids. In addition to water, the reaction environment of the present invention essentially comprises an organic liquid, such as an acetal, ketone and others to be described in detail. As already pointed out, this aspect of our invention distinguishes from the prior art use of hydrocarbon type solvents.

An aqueous ketone reaction medium is very useful in the present invention because of its greater stability under conditions of the process and because of the fact that a ketone reaction medium, particularly diisopropyl ketone and di-normal propyl ketone, help to suppress the formation of additional ketones from the reaction. However, as will be apparent from the examples, the present invention also contemplates the use of various reaction mediums. That is, as already indicated, butyraldehyde dibutylacetal or aldehyde reaction mediums have also been found to favor the production of the straight chain or normal compound formation. For example, aqueous (as described above) butyraldehyde as a reaction medium for containing the catalyst is very useful as the reaction medium in which to react propylene, carbon monoxide, and hydrogen, since it is the product of this reaction and facilitates the formation of further normal compound without the contamination of the desired product with hydrocarbon or other materials which have heretofore been used as the reaction medium.

Further understanding of our invention will be had from a consideration of the following specific examples which are set forth primarily for the purposes of illustration.

*Example I*

Twenty grams of a catalyst containing 36% cobalt, 2% thoria, 2% magnesia and 60% supercel and 64% reduced was suspended in 200 grams of butyraldehyde dibutylacetal and charged to a one liter rocker autoclave. 126 grams (3 mols) of propylene and excess carbon monoxide and hydrogen were charged to the autoclave at 2400–3000 p. s. i. and 130±10° C. The oxonation took place at the rate of 6 gram moles/hour. The product was blown off hot, condensed and distilled. A 47% yield of a mixture of normal and isobutyraldehydes in the ratio 2.1/1 was obtained.

The above operating procedure was varied by the addition of 20 grams of water to the catalyst slurry in butyraldehyde dibutylacetal. The oxonation took place at the rate of 22 gram mols/hour and a 74% yield of normal and isobutyraldehydes in the ratio 2.3/1 was obtained.

*Example II*

Twenty grams of a catalyst containing 36% Co, 2% $ThO_2$, 2% Mg, 60% kieselguhr and 73% reduced was suspended in 200 grams of diethyl ketone and charged to a one liter rocker autoclave. Propylene was reacted with carbon monoxide and hydrogen as in Example I and the rate of oxonation was 3.53 gram moles/hour. Distillation of the product gave 7 grams of isobutyraldehyde-$H_2O$ azeotrope and 112 grams of n-butyraldehyde-$H_2O$ azeotrope, or a ratio of normal butyraldehyde to isobutyraldehyde of 16/1. The yield was 52%.

The previous operating conditions were varied by the addition of 12 grams of water. The oxonation took place at the rate of 14.4 gram moles/hour and a 69% yield of normal and isobutyraldehyde in the ratio 18/1 was obtained.

*Example III*

Eight grams of cobalt carbonyl [$Co(CO)_4$]$_2$ was dissolved in 200 grams of methyl ethyl ketone and the solution was charged to a shaker autoclave. Eighty-four grams of propylene (2 gram moles), together with an excess of carbon monoxide and hydrogen, was charged to the autoclave at 2200–3500 p. s. i. and 140±10° C. The reaction was complete in 26 minutes, 4.62 gram moles/hour, and distillation gave a 56% yield of a mixture of n- and iso-butyraldehydes.

The above operation was changed by the addition of 30 grams of water to the $Co(CO)_4$ solution in methyl ethyl ketone. Oxonation took place at the rate of 17.1 gram moles/hour and a 77% yield of butyraldehydes was obtained.

*Example IV*

In the continuous production of butyraldehydes, a reactor 20' high and 9" I. D. filled with 30 alternating partial plates, was charged with a slurry comprised of 30 pounds of a solid catalyst with the composition 38% Co, 2% $ThO_2$, 2% MgO, 58% supercel and 64% reduced in 20 gallons of butanol. The catalyst slurry was heated to 120° C. by cycling a feed gas rich in hydrogen through a preheater and then through the catalyst slurry in the reactor. Propylene was pumped in gradually to the recycle gas stream immediately before the preheater and the exothermic reaction was allowed to bring the temperature in the reactor to 140±5° C. This temperature was maintained by controlling the temperature of the incoming recycle gas and by distilling out the mixture of butyraldehydes as required. During the continuous operation of this unit, there was wide variation in the reactor liquid composition due to the formation of high boilers and a corresponding variation in the rate of aldehyde production. The high boilers contain substantial amounts of butals and butyl butyrate esters as well as lesser amounts of glycol esters and aldol condensation products. The reactor liquid composition varied within the limits:

5–30% butyraldehydes
10–70% butanol, and
10–85% high boilers

With a reactor liquid composition of 40–70% butanol and 20–40% high boilers and the remainder butyraldehydes, a daily production of 850–1100 pounds of butyraldehydes was obtained. With high boilers in excess of 40%, there is gradual decrease in the daily production of aldehydes, and at 80% high boilers the production rate is as low as 300 pounds per day.

The rate of production was stabilized at 1200–1500 pounds per day by maintaining 6–20 weight percent water in the reactor space. The yield of aldehydes based on the propylene charged to the reactor space increased from 55 percent to 80–85 percent.

*Example V*

Twenty grams of catalyst with the composition described in Example I and 61% reduced and suspended in 200 grams of propanol was charged to a one liter stainless steel rocker autoclave. Ethylene, carbon monoxide and hydrogen in equimolar amounts were pressed in at 2500–3500 p. s. i and reacted at 130±10° C. Three gram moles of ethylene was reacted in 23 minutes, 7.82 gram moles/hour. Distillation of the reaction product gave a 47% yield of propionaldehyde.

The reaction was repeated with the addition of 10 grams of water to the above catalyst slurry. The rate of oxonation was 20.6 gram moles/hour and a 72% yield of propionaldehyde was obtained.

*Example VI*

Twenty grams of solid catalyst containing 30.1% cobalt, 1.7% thoria, 2.1% magnesia, and 66% supercel was suspended in 400 grams of ethyl crotonate and charged to a one liter rocker autoclave. Carbon monoxide and hydrogen were pressed in at 2500–3500 p. s. i. and 130±10° C. The rate of oxonation was 4.3 gram moles/hour. Distillation of the product gave a 42% yield of gamma formyl ethyl butyrate.

The above reaction conditions were varied by the addition of 60 grams of water. The rate of oxonation was 13.6 gram moles/hour and a 70.2% yield of gamma formyl ethyl butyrate was obtained.

It may be seen from the foregoing that our method comprises the reaction of olefins with carbon monoxide and hydrogen carried out at 40–400 atmospheres and 50–250° C. in the presence of a metal carbonyl-forming catalyst dissolved or suspended in a suitable aqueous diluent. Typical catalysts containing cobalt and/or iron with or without additional promoter materials such as thoria, alumina, silica, magnesia and manganese are used. Solutions or suspensions of metal carbonyl forming salts may also be used.

Suitable diluents to which the limited quantity of water may be incorporated include the simple aliphatic alcohols such as ethanol, propanol, isopropanol, butanol, isobutanol and ketones such as acetone, methylethyl ketone, diisopropyl ketone, acetals, ketals, esters and the like, as apparent from the examples.

The specific choice of organic diluents (of a non-hydrocarbon type) depends to some extent on the ease of separation from the aldehyde product.

In a continuous operation, a suspension of catalyst in a suitable diluent is pumped continuously to a column reactor maintained at 75–200° C. and 40–400 atmospheres. Agitation is provided by circulating a portion of the synthesis gas rich in hydrogen through the reactor with a recycle compressor. Aldehyde product and diluent are distilled out at a controlled rate and separated as by distillation. Catalyst or catalyst forming materials, both new and regenerated, are returned continuously to the reactor as a suspension in the recovered diluent. In this type of operation there is often a gradual build-up of high boilers in the reactor space with a proportional increase in the reaction time required to produce a specific amount of aldehyde product. This decreased activity due to the reaction medium can be avoided by maintaining a minimum of 30% alcohol in the reactor space and particularly by adding 0.1–20 volume percent water, in accordance with the preferred embodiment of the present invention.

We believe that the improved operation and high rates of reaction, as described above, where certain aqueous conditions are maintained in accordance with the present invention, may be explained as follows:

In the production of aldehydes by the reaction of olefins with carbon monoxide and hydrogen in the presence of carbonyl-forming metals, we believe that the carbonyl hydride formed from the metal is the active form of the catalyst. Under neutral or mildly alkaline conditions, cobalt carbonyl will react in the presence of our water addition to form cobalt carbonyl hydride.

$$3Co(CO)_4 + 2H_2O \rightarrow 2CoH(CO)_4 + Co(OH)_2 + 4CO$$

In the free state and under neutral or mildly alkaline conditions, cobalt carbonyl hydride also decomposes to form cobalt carbonyl and hydrogen.

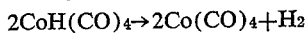

$$2CoH(CO)_4 \rightarrow 2Co(CO)_4 + H_2$$

Thus, cobalt carbonyl hydride is the transitory form of the catalyst furnishing both hydrogen and carbon monoxide or formyl groups to the olefin.

Alcohols may also react with cobalt carbonyl to form a complex which reacts under Oxo conditions to form cobalt carbonyl hydride and regenerate the alcohol.

$$Co(CO)_4 + ROH \rightarrow [Co(CO)_2 OR]H + 2CO$$

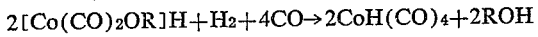

$$2[Co(CO)_2OR]H + H_2 + 4CO \rightarrow 2CoH(CO)_4 + 2ROH$$

wherein R is ethyl, propyl, isopropyl, butyl, isobutyl, etc. In accord with this reaction, it has been found that alcohols are useful reaction mediums for the oxonation of olefins containing 2–8 carbon atoms. Ketones, acetals, esters, ethers and aromatic hydrocarbons can also be used, but there is an increase in the reaction time required with less polar solvents. In the production of aldehydes, this longer reaction time may result in the formation of aldehyde condensation products and a resultant lower yield of free aldehyde product. In continuous reaction using alcohol diluents, there is a gradual build-up in high boiler materials which reduces the polarity of the reaction medium.

We have thus found that increased yields of aldehyde products and minimum reaction times can be obtained by employing as much as 20 volume percent water in the reactor space. The reaction time required is influenced by the water present, particularly in the case of ketones and other organic media miscible in whole or in part with water, and with hydrolyzable organic materials such as acetals, ketals, and esters.

It is believed that from the above it may be seen that an improved process has been provided wherein predominate yields of the straight chain or normal compound can be obtained at high reaction rates from the reaction of olefinic compounds with carbon monoxide and hydrogen. Since the various types of olefins, the gas ratios of carbon monoxide and hydrogen, and the like details, are already known in the art, such details are not emphasized herein, but the description has been directed principally to the constitution of the aqueous reaction environment in accordance with the present invention, whereby the improved results of obtaining predominate yields at high rates of the normal compound may be obtained. Likewise, the preferred reaction involving the use of propylene and the utilization of the cobalt hydride type of catalyst has been emphasized, but the invention is not to be limited thereto.

For convenience of reference in the above description and claims, in some instances the term "aqueous carbonyl liquid" has been used in describing our aqueous ketone and/or acetal reaction environment. In general, it is preferred that the aqueous liquid constitutes all of the reaction medium except for incidental impurities, product formed, or the like.

We claim:

1. A process of producing predominant yields of straight chain aldehydes, comprising incorporating a catalyst selected from the group consisting of the metals cobalt and iron, their carbonyls and carbonyl forming compounds thereof, into a reaction medium, the major portion of which is a liquid selected from the group consisting of (a) lower aliphatic ketone, and (b) a mixture of lower aliphatic acetal and lower aliphatic alcohol, there being present 0.1 to 20 volume percent of water based on the volume of the other ingredients of the medium in each instance, and introducing a straight chain lower aliphatic olefin having one less carbon atom than the desired aldehyde product, carbon monoxide and hydrogen as reactants into the catalyst containing reaction medium where they react at 90–175° C. and 40–700 atm., the water being present in an amount sufficient to increase the rate of reaction and the ratio of straight chain to branched chain aldehyde produced, compared to operation in the absence of water.

2. A process of producing predominant yields of straight chain aldehydes, comprising incorporating a catalyst selected from the group consisting of the metals cobalt and iron, their carbonyls and carbonyl forming compounds thereof, into a reaction medium containing as its major ingredient a lower aliphatic ketone together with 0.1 to 20 volume percent of water based on the ketone volume, and introducing a straight chain lower aliphatic olefin having one less carbon atom than the desired aldehyde product, carbon monoxide and hydrogen as reactants into the catalyst containing reaction medium where they react at 90–175° C. and 40–700 atm., the water being present in an amount sufficient to increase the rate of reaction and the ratio of straight chain to branched chain aldehyde produced, compared to operation in the absence of water.

3. A process of producing predominant yields of n-butyraldehyde, comprising incorporating a catalyst selected from the group consisting of the metals cobalt and iron, their carbonyls and carbonyl forming compounds thereof, into a reaction medium containing as its major ingredient a lower aliphatic ketone together with 0.1 to 20 volume percent of water based on the ketone volume, and introducing n-propylene, carbon monoxide and hydrogen as reactants into the catalyst containing reaction medium where they react at 90–175° C. and 40–700 atm., the water being present in an amount sufficient to increase the rate of reaction and the ratio of straight chain to branched chain aldehyde produced, compared to operation in the absence of water.

4. A process according to claim 3 where the ketone is diethyl ketone.

5. A process according to claim 3 wherein the ketone is methyl ethyl ketone.

6. In the Oxo process, a method for producing straight chain aldehydes as the predominant aldehyde product, comprising reacting a straight chain lower aliphatic olefin having one less carbon atom than the desired aldehyde product, carbon monoxide and hydrogen at 90–175° C. and 40–700 atm., in a reaction medium containing as its major ingredient a lower aliphatic ketone together with 0.1 to 20 volume percent of water based on the ketone volume, the water present having the effect of increasing the rate of reaction and the ratio of straight chain to branched chain aldehyde produced, compared to operation in the absence of water.

7. In the Oxo process, a method for producing n-butyraldehyde as the predominant aldehyde product, comprising reacting n-propylene, carbon monoxide and hydrogen at 90–175° C. and 40–700 atm., in a reaction medium containing as its major ingredient a lower aliphatic ketone together with 0.1 to 20 volume percent of water based on the ketone volume, the water present having the effect of increasing the rate of reaction and the ratio of straight chain to branched chain aldehyde produced, compared to operation in the absence of water.

8. A process according to claim 7 wherein the ketone is diethyl ketone.

9. A process according to claim 7 wherein the ketone is methyl ethyl ketone.

References Cited in the file of this patent

UNITED STATES PATENTS

| Number | Name | Date |
|---|---|---|
| 2,437,600 | Gresham et al. | Mar. 9, 1948 |
| 2,477,553 | McKeever | July 26, 1949 |
| 2,509,878 | Owen | May 30, 1950 |
| 2,517,383 | Brooks | Aug. 1, 1950 |
| 2,576,113 | Hagemeyer | Nov. 27, 1951 |
| 2,600,571 | Prichard | June 17, 1952 |

OTHER REFERENCES

Fiat Final Report 1000 PB 81383 (pp. 20–24, 26, 27 and 34), December 26, 1947.

Oxo Process—patent applications of I. G. Farber & Ruhrchemie, pp. 10–13, 35–37 and 62–63, translated by Chas. Meyer & Co., New York, N. Y., 1948. (See also TOM Reel 36, item 21 and part of item 36, April 1946.)